G. J. OLENDORF.
Poling Hops.
No. 84,299.  Patented Nov. 24, 1868.
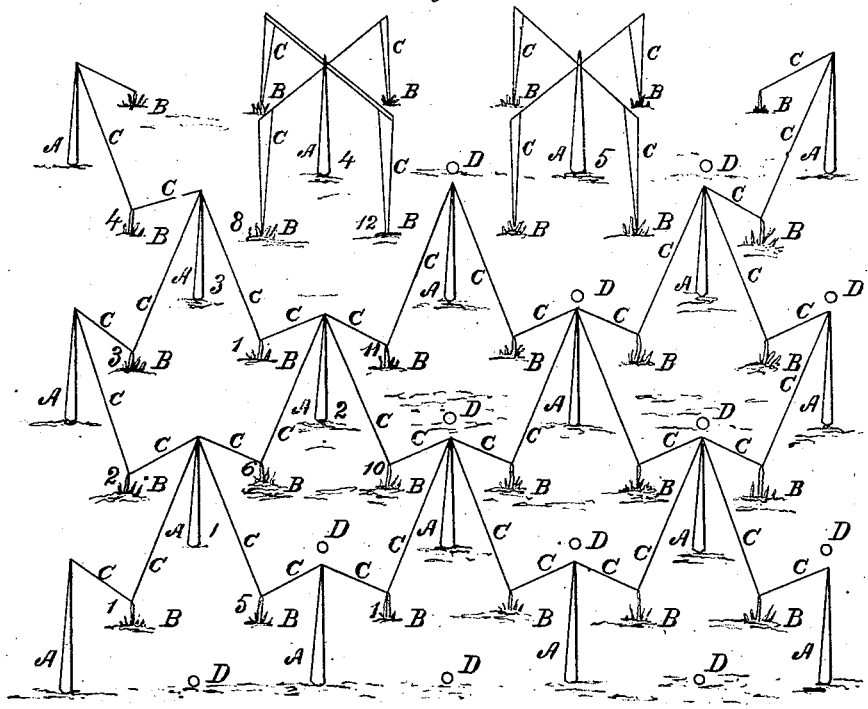
Witnesses:
Samuel Harper
Hiram Kinne
Inventor:
Garret J. Olendorf

United States Patent Office.

GARRET J. OLENDORF, OF MIDDLEFIELD, NEW YORK.

Letters Patent No. 84,299, dated November 24, 1868.

IMPROVED MODE OF POLING HOPS.

The Schedule referred to in these Letters Patent and making part of the same.

*To all whom it may concern:*

Be it known that I, GARRET J. OLENDORF, of the town of Middlefield, in the county of Otsego, and State of New York, have invented a new and improved Mode of Poling Hops; and I do hereby declare that the following is a full and exact description thereof, reference being had to the accompanying drawings, and to the letters of reference marked thereon, in which—

Figure 1 is a view of a yard, with one pole set for every two hills of hops.

Figure 2 is a yard, with one pole for each hill of hops.

Same letters of reference refer to the same part on each of the figures.

The nature of my invention consists in using the ordinary poles, commonly used in poling hops when no twine is used, and setting said poles, not in the hills of hops, but, in the space between said hills, using a stake of any desired length, long or short, set in each hill, to which I attach twine, that goes from each stake to the tops of the poles, and I can arrange them so as to use but one pole for two hills of hops, thereby saving three-quarters of the number of poles used, when set in the ordinary way, with two poles to each hill of hops.

A A, &c., are poles of the ordinary length, say from ten to fourteen feet, which may be set either in line with the rows of hops or in the square between the rows, and I prefer the latter method.

B B, &c., are the hills of hops, with a stake driven in each, of any desired length, from a hub to six or seven feet long.

C C, &c., is twine fastened to the stakes, and in any suitable manner connected to the poles at or near the top.

By referring to drawing, fig. 1, it will be seen that hills 1 and 2 of the first, and hills 5 and 6 of the second row of hops, have one string from each running to pole No. 1, and one string from each hill to poles in opposite directions. Pole No. 2 is set between the second and third rows of hops, with twine running from hills 6, 7, 10, and 11 to its top, while pole 3 is set between the first and second rows, and pole 4 between the second and third rows of hops, thus alternately changing, giving the sun and air a better chance to circulate among the vines than if set along between the same rows without changing. I run two vines up each twine when I use but one pole for two hills of hops. Cross-bars on the tops of the poles, and twine running from the stakes to said bars, may be used, as shown by poles 4 and 5 in fig. 1; but I prefer running the twine to the poles.

D D, &c., fig. 1, show the places where the poles would be set if used with one pole for each hill of hops.

Fig. 2 represents one pole for each hill of hops, the left side of said figure being arranged with two strings from each hill, and two vines to each string, running to the poles on each side of them, while the right side of said fig. 2 is arranged with four strings to each hill, running, one vine on each string, to the tops of the four nearest poles.

By this method of setting the poles away from the hills, it gives a better chance to keep them clear of weeds, and also for the sun to get to the roots.

What I claim as my invention, and desire to secure by Letters Patent, is—

The poles A, hill-stakes B, and cords C, when arranged as and for the purposes herein set forth.

GARRET J. OLENDORF.

Witnesses:
SAMUEL HARPER,
HIRAM KINNE.